United States Patent [19]

Speranza et al.

[11] Patent Number: 4,946,924

[45] Date of Patent: Aug. 7, 1990

[54] SECONDARY ISOPROPYL AMINE DERIVATIVES OF POLYOXYALKYLENE DIAMINES AND TRIAMINES

[75] Inventors: George P. Speranza, Austin; Jiang-Jen Lin, Round Rock; James H. Templeton, Austin, all of Tex.

[73] Assignee: Texaco Chemical Company, White Plains, N.Y.

[21] Appl. No.: 264,643

[22] Filed: Oct. 31, 1988

Related U.S. Application Data

[62] Division of Ser. No. 135,798, Dec. 21, 1988, abandoned.

[51] Int. Cl.$^5$ .............................................. C08G 59/50
[52] U.S. Cl. .................................... 528/111; 528/407; 525/504
[58] Field of Search ................. 528/111, 407; 525/504

[56] References Cited

U.S. PATENT DOCUMENTS

| | | | |
|---|---|---|---|
| 3,364,239 | 1/1968 | Speranza | 549/472 |
| 3,580,887 | 5/1971 | Hubin | 528/111 |
| 3,609,121 | 9/1971 | Lohse et al. | 528/111 |
| 4,179,552 | 12/1979 | Waddill | 528/111 |
| 4,436,891 | 3/1984 | Umeda et al. | 528/111 |

Primary Examiner—Earl Nielsen
Attorney, Agent, or Firm—Jack H. Park; Kenneth R. Priem; Carl G. Ries

[57] ABSTRACT

Secondary isopropylamine terminated polyoxyethylene and/or polyoxypropylene diamines or triamines are formed in a one-step reaction when a polyoxyethylene and/or polyoxypropylene primary diamine or triamine is hydrogenated with hydrogen in the presence of a hydrogenation catalyst, hydrogen and acetone. The secondary isopropylamine terminated polyoxyethylene and/or polyoxypropylene primary diamines or triamines are useful as curing agents for epoxy resins.

15 Claims, No Drawings

SECONDARY ISOPROPYL AMINE DERIVATIVES OF POLYOXYALKYLENE DIAMINES AND TRIAMINES

This is a division, of application Ser. No. 07/135,798, filed Dec. 21, 1987, aband.

BACKGROUND OF THE INVENTION

1. Technical Field of the Invention

This invention relates to secondary isopropyl amine derivatives of polyoxyalkylene primary diamines and triamines. More particularly, this invention relates to secondary isopropyl amine derivatives of polyoxyethylene and/or polyoxypropylene primary diamines or triamines prepared by the reaction of a polyoxyethylene and/or polyoxypropylene primary diamine or triamine with acetone in the presence of a hydrogenation catalyst and hydrogen. Still more particularly, this invention relates to a method wherein a polyoxyethylene and/or polyoxypropylene primary diamine or triamine having a molecular weight of about 200 to about 400 is reacted with acetone in the presence of hydrogen and a hydrogenation catalyst to provide a secondary isopropyl amine terminated polyoxyethylene and/or polyoxypropylene reaction product and to the use of such products as curing agents for epoxy resins.

2. Prior Art

Speranza et al. U.S. Pat. No. 3,110,732 is directed to a method for preparing primary amine derivatives of polyoxyalkylene glycol by a three-step process wherein an alkanolamine having a primary amine group is reacted with a higher carbonyl compound such as methylethyl ketone, isobutyraldehyde, etc., to form a condensation product which may be either a Schiff base or an oxazolidine which is thereafter alkoxylated with an alkylene oxide to provide an adduct followed by hydrolysis of the adduct to form a primary amine basic polyether composition.

Speranza U.S. Pat. No. 3,364,239 is directed to secondary amino polyalkoxy monoalkanols which are prepared by reacting a primary amino polyalkoxy alkanol with a higher carbonyl compound such as methylethyl ketone, butyraldehyde, etc., to form a Schiff base reaction product which is thereafter hydrogenated in the presence of a hydrogenation catalyst at an elevated temperature and pressure to provide the secondary amino polyalkoxy monoalkanol.

Malz, Jr. et al. U.S. Pat. No. 4,607,104 is directed to a process wherein 2,2,6,6-tetraalkyl-4-piperidylamines are prepared by reacting an amine with 2,2,6,6-tetraalkyl-4-piperidone in the presence of water, an aliphatic alcohol or aliphatic glycol and a platinum, nickel or cobalt catalyst.

BACKGROUND OF THE PRESENT INVENTION

As exemplified by the Speranza and Speranza et al. patents, it is known that when a higher ketone such as methylethyl ketone is reacted with a primary amine the reaction product is a Schiff base or an oxazolidine. This Schiff base may thereafter be hydrogenated to provide a secondary amino polyalkoxy alkanol. Thus, a two-step reaction is required. Moreover, acetone is not a suitable ketone for the use in a two-step reaction of this nature because of its boiling point.

It has now been surprisingly discovered that when a polyoxyethylene and/or polyoxypropylene primary diamine or triamine is reacted with acetone in the presence of a hydrogenation catalyst and hydrogen, secondary isopropylamine terminated polyoxyethylene and/or polyoxypropylene primary diamines and triamines can be formed in one step. The polyoxyethylene and/or polyoxypropylene primary diamine or triamine should have a molecular weight within the range of about 200 to about 400, the ratio of acetone to primary diamine or triamine starting material should be within the range of about 1.5 to about 3 mole equivalents of acetone per mole of primary amine group present in the primary diamine or triamine and the reaction should be conducted at a temperature within the range of about 50° to about 200° C. and a pressure within the range of about 100 to about 4000 psig., including a hydrogen partial pressure of about 50 to about 2,500 psi.

The secondary isopropylamine derivatives that are prepared by the process have been found to be useful as flexible curing agents for epoxy resins.

SUMMARY OF THE INVENTION

The starting materials for the present invention are a polyoxypropylene and/or polyoxyethylene primary diamine or triamine having a molecular weight of 200 to about 400, acetone, hydrogen and a hydrogenation catalyst.

The Polyoxyalkylene Primary Diamine and Triamine Starting Materials

The polyoxyalkylene polyamine starting materials for the present invention are selected from the group consisting of polyoxypropylene diamines and triamines, and polyoxyethylene diamines, and polyoxyalkylene diamines and triamines containing mixtures of both ethylene oxide and propylene oxide and, preferably, mixtures of from about 5 to about 40 wt. % of ethylene oxide with, correspondingly, from about 95 to 60 wt. % of propylene oxide. Where mixed propylene oxide/ethylene oxide polyols are employed, the ethylene oxide and propylene oxide may be premixed prior to reaction to form a hetero copolymer, or the ethylene oxide and the propylene oxide may be sequentially added to the ethoxylation kettle to form block oxypropylene/oxyethylene copolymers.

The polyoxyalkylene primary polyamine starting material are selected from the group consisting of polyoxyalkylene primary diamines and triamines having the formula:

$$R-\left[(OCH_2CH)_n-OCH_2-CH-NH_2\right]_m \quad (II)$$
$$\phantom{R-[}\ \ R'\phantom{)_n-OCH_2-}R'$$

Wherein R is the nucleus of an oxyalkylation-susceptible polyhydric alcohol containing 2 to 12 carbon atoms and 2 or 3 hydroxyl groups, and R' is hydrogen or methyl, n is a number sufficient to impart a molecular weight of about 200 to about 400 to the molecule, and m is an integer having a value of 2 to 3.

One group of appropriate polyoxyalkylene diamines that may be used are those that are sold by the Texaco Chemical Company as Jeffamine ® D-series products having the formula:

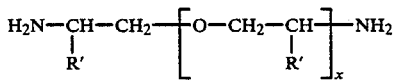

(III)

Wherein R' independently represents hydrogen or methyl and x is a number having an average value of about 1 to about 6.

Representative products having this structural formula include polyoxypropylene diamines (wherein R' is methyl) having an average molecular weight of about 230 wherein the value of x is between 2 and 3 (Jeffamine® D-230 amine), and polyoxypropylene diamines having an average molecular weight of about 400 wherein x has a value between about 5 and 6 (Jeffamine® D-400 amine).

As other examples, the primary amine starting material may be triethylene glycol diamine (sold commercially by Texaco Chemical Company as Jeffamine® EDR-148) and tetraethylene glycol diamine (sold by Texaco Chemical Company commercially as Jeffamine® EDR-192).

An example of appropriate polyoxypropylene triamines that may be used as a starting material for the present invention include triamines sold by Texaco Chemical Company as Jeffamine® T-series products having the formula:

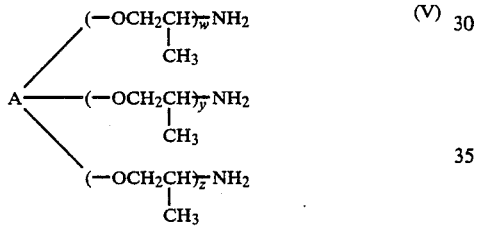

(V)

Wherein A represents the nucleus of an oxyalkylation susceptible trihydric alcohol containing about 3 to about 6 carbon atoms, w, y and z are numbers and the average value of the sum of w+y+z is sufficient to impart an average molecular weight of not more than about 400 to the molecule.

An example of such a product is a commercial product having an average molecular weight of about 400 wherein A represents a trimethylol propane nucleus (Jeffamine® T-403 amine).

Acetone

Secondary isopropylamine derivatives of the primary diamine and triamine starting materials are prepared by reacting the diamine or triamine starting material with acetone.

It is important that the acetone be utilized in the right proportions if the desired products are to be obtained with good yield and selectivity. Thus, from about 1.5 to about 3 mole equivalents of acetone should be used for each mole equivalent of primary amine group in the primary amine starting material. For example, if the starting material is a polyoxyalkylene primary diamine, from about 3 to about 6 moles of acetone should be used per mole of diamine starting material. For a triamine, the molar ratio would be within the range of about 4.5:1 to about 9:1.

Ketones other than acetone or aldehydes do not give equivalent results. Thus, either a loss of yield and/or selectivity will be experienced when the reaction parameters of the present invention are used with other ketones or with aldehydes.

Hydrogen

The acetone is reacted with the polyoxyalkylene primary diamine or triamine starting material in the presence of added hydrogen. The reaction is conducted at an elevated temperature and pressure. Normally, the reactants can be pressured at a desired pressure with hydrogen and hydrogen may be used thereafter to maintain the pressure so that the reaction pressure and the hydrogen partial pressure will be essentially the same. The reaction pressure should be within the range of about 100 to about 4000 psi., including a hydrogen partial pressure of about 50 to about 2,500.

The Hydrogenation Catalyst

Any suitable hydrogenation catalyst may be used such as a catalyst comprising one or more of the metals of group VIIIB of the Periodic Table, such as iron, cobalt, nickel, ruthenium, rhodium, palladium, platinum, mixed with one or more metals of group VIB of the Periodic Table such as chromium, molybdenum or tungsten. A promoter from group IB of the Periodic Table, such as copper, may also be included. As an example, a catalyst may be used comprising from about 60 to 85 mole percent of nickel, about 14 to 37 mole percent of copper and about 1 to about 5 mole percent of chromium (as chromia), such as a catalyst disclosed in Moss U.S. Pat. No. 3,151,112 or Yeaky U.S. Pat. No. 3,654,370. As another example, a catalyst of the type disclosed in Boettger et al. U.S. Pat. No. 4,014,933 may be used containing from about 70 to about 95 wt. % of a mixture of cobalt and nickel and from about 5 to about 30 wt. % of iron. As another example, a catalyst of the type disclosed in Habermann U.S. Pat. No. 4,152,353 may be used, such as a catalyst comprising nickel, copper and a third component which may be iron, zinc, zirconium or a mixture thereof, e.g., a catalyst containing from about 20 to about 49 wt. % of nickel, about 36 to about 79 wt. % of copper and about 1 to about 15 wt. % of iron, zinc, zirconium or a mixture thereof.

Reaction Conditions

As indicated above, the reaction should be conducted at a temperature within the range of about 50° to about 200° C. and a pressure within the range of about 100 to about 4,000 psig., including a hydrogen partial pressure of about 50 to about 2,500 psi.

The reaction may be conducted on a batch base using powdered hydrogenation catalysts or on a continuous basis utilizing a pelleted hydrogenation catalyst.

When the reaction is conducted on a batch basis, reaction time should preferably be within the range of about 1 to about 12 hours. When the reaction is conducted on a continuous basis, wherein the primary amine starting material and the acetone are continuously passed over a bed of pelleted hydrogenation catalysts, the feed rate for the primary amine should preferably be within the range of about 0.5 to about 3 w/hr/w for the primary amine and about 0.5 to about 3 w/hr/w for the acetone.

USE OF ISOPROPYL SECONDARY AMINES AS FLEXIBLE CURING AGENTS FOR EPOXY RESINS

It has been discovered in accordance with the present invention that the polyoxyethylene and/or polyoxypropylene primary diamines and triamines are useful as flexible curing agents for epoxy resins.

UTILITY OF SECONDARY ISOPROPYL AMINES AS EPOXY CURING AGENTS

A particular utility for which the secondary poly (secondary isopropyl amino) polyoxyethylene and/or polyoxypropylene diamines and triamines of the present invention are well suited is found when they are used as curing agents for 1,2-epoxy resins.

It is known to use amines such as aliphatic or aromatic amines for curing 1,2-epoxy resins as shown, for example, by Waddill U.S. Pat. No. 4,139,524 and Marquis et al. U.S. Pat. No. 4,162,358. See also, the textbook "Handbook of Epoxy Resins" by H. Lee and K. Neville, McGraw-Hill Book Company, 1967.

Generally the vicinal epoxide compositions that can be cured using the curing agents of this invention are organic materials having an average of more than one reactive 1,2-epoxide group. These polyepoxide materials can be monomeric or polymeric, saturated or unsaturated, aliphatic, cycloaliphatic, aromatic or heterocyclic, and may be substituted if desired with other substituents besides the epoxy groups, e.g., hydroxyl groups, ether radicals, halogenated phenyl groups and the like.

The most widely used epoxy resins are diglycidyl ethers of bisphenol A:

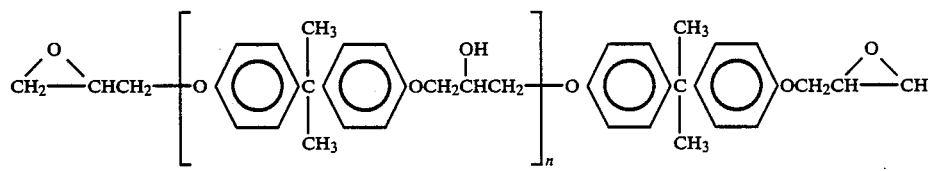

(VII)

where n equals an integer of up to about 10 to 20.

However, these epoxides are representative of the broader class of epoxide compounds that are useful in making epoxy resins.

A widely used class of polyepoxides that can be cured according to the practice of the present invention includes the resinous epoxy polyethers obtained by reacting an epihalohydrin, such as epichlorohydrin, and the like, with either a polyhydric phenol or a polyhydric alcohol. An illustrative, but by no means exhaustive, listing of suitable dihydric phenols includes 4,4'-isopropylidene bisphenol, 2,4'-dihydroxydiphenylethylmethane, 3,3'-dihydroxydiphenyldiethylmethane, 3,4'-dihydroxydiphenylmethylpropylmethane, 2,3'-dihydroxydiphenylethylphenylmethane, 4,4'-dihydroxydiphenylmethane, 4,4'-dihydroxydiphenylbutylphenylmethane, 2,2'-dihydroxydiphenylditolylmethane, 4,4'-dihydroxydiphenyltolylmethyl-methane and the like. Other polyhydric phenols which may also be co-reacted with an epihalohydrin to provide these epoxy polyethers are such compounds as resorcinol, hydroquinone, substituted hydroquinones, e.g., tert-butylhydroquinone, and the like.

Among the polyhydric alcohols that can be co-reacted with an epihalohydrin to provide the resinous epoxy polyethers are such compounds as ethylene glycol, propylene glycol, butylene glycols, pentane diols, bis(4-hydroxycyclohexyl)dimethylmethane, 1,4-dimethylolbenzene, glycerol, 1,2,6-hexanetriol, trimethylolpropane, mannitol, sorbitol, erythritol, pentaerythritol, their dimers, trimers and higher polymers, e.g., polyethylene glycols, polypropylene glycols, triglycerol, dipentaerythritol and the like, polyallyl alcohol, polyhydric thioethers, such as 2,2'-, 3,3'-tetrahydroxydipropylsulfide and the like, mercapto alcohols such as α-monothioglycerol, α,α'-dithioglycerol, and the like, polyhydric alcohol partial esters, such as monostearin, pentaerythritol monoacetate, and the like, and halogenated polyhydric alcohols such as the monochlorohydrins of glycerol, sorbitol, pentaerythritol and the like.

Another class of polymeric polyepoxides that can be cured by means of the above-described curing agents includes the epoxy novolac resins obtained by reacting, preferably, in the presence of a basic catalyst, e.g., sodium or potassium hydroxide, an epihalohydrin, such as epichlorohydrin, with the resinous condensate of an aldehyde, e.g., formaldehyde, and either a monohydric phenol, e.g., phenol itself, or a polyhydric phenol. Further details concerning the nature and preparation of these epoxy novolac resins can be obtained in Lee, H. and Neville, K., "Handbook of Epoxy Resins".

It will be appreciated by those skilled in the art that the polyepoxide compositions that can be cured according to the practice of the present invention are not limited to the above described polyepoxides, but that these polyepoxides are to be considered merely as being representative of the class of polyepoxides as a whole.

The amount of curing agent that is employed in curing polyepoxide compositions will depend on the amine equivalent weight of the curing agent employed. The total number of equivalents of amine group is preferably from about 0.8 to about 1.2 times the number of epoxide equivalents present in the curable epoxy resin composition with a stoichiometric amount being most preferred.

Various conventionally employed additives can be admixed with these polyepoxide-containing compositions prior to final cure. For example, in certain instances it may be desired to add minor amounts of other co-catalysts, or hardeners, along with the curing agent system herein described. Conventional pigments, dyes, fillers, flame retarding agents and other compatible natural and synthetic resins can also be added. Furthermore, known solvents for the polyepoxide materials such as acetone, methyl ethyl ketone, toluene, benzene, xylene, dioxane, methyl isobutyl ketone, dimethylformamide, ethylene glycol monoethyl ether acetate, and the like, can be used if desired, or where necessary. cl WORKING EXAMPLES—BATCH EXPERIMENTS

Preparation of N-Isopropyl Diamines and Triamines

Example 1 (6245-49)—Hydrogenation of Triethylene Glycol Diamine (Jeffamine EDR-148 Amine) with Acetone (2:3 Ratio)

To a 1-liter stirred autoclave was charged EDR-148 (296 g, 2 moles), acetone (174 g, 3 moles) and a nickel, copper, chromia catalyst containing about 75 mole % nickel, 23 mole % copper and 2 mole % chromium (25 g). The autoclave was sealed and flushed twice with hydrogen. The reactor was pressured to 1000 psi of hydrogen and heated to 180° C. Then, the pressure was raised to 2500 psi and maintained at this pressure with incremental addition of hydrogen until no pressure uptake was noticed. The reaction time was about 5 hrs. The mixture was allowed to cool to room temperature. The catalyst was recovered through filtration. The filtrate was distilled to give N-isopropyl triethylene glycol diamine ($^1$) (approx. 90% purity, b.p. 120°–129° C./12 mm Hg, 200 g) and N,N'-diisopropyl triethylene glycol diamine, ($^2$) (b.p. 134°–140° C./11 mm Hg, 66.2 g).

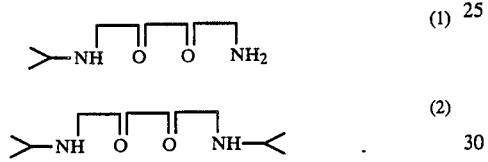

Example 2 (6245-81)—Hydrogenation of Triethylene Glycol Triamine (Jeffamine EDR-148 Amine) and Acetone Mixture (2:4.1 Mole Ratio)

The experimental procedures of the above example were followed. The mixture of EDR-148 (296 g, 2 moles) and acetone (240 g, 4.1 moles) was hydrogenated. The reaction conditions were 2900 psi and 180° C. for about 5 hours using 5 g of the nickel, copper, chromia catalyst of Example 1. After filtration, the crude product contained total amine 7.36 meq/g and secondary amine 6.65 meq/g, indicating a high conversion of the EDR-148/acetone reaction.

Example 3 (6245-89)—Hydrogenation of Triethylene Glycol Diamine (Jeffamine EDR-148 Amine) with Acetone (1.0:1.1 Ratio)

The procedures of Example 1 were repeated, except using EDR-148 (296 g, 2 moles), acetone 9128 g, 2.2 moles) and 25 g of the nickel, copper, chromia catalyst of Example 1. The reaction conditions were 2900 psi H$_2$ and 180° for about 6 hours. The catalyst was removed by filtration. The amine content of 3.97 meq/g (total amine) and 2.95 meq/g (secondary amine) was found in the crude product.

Example 4 (6250-52)—Hydrogenation of Triethylene Glycol Diamine (Jeffamine EDR-148 Amine) with Acetone (2:4.1 Mole Ratio)

The experimental procedures were repeated except using EDR-148 (296 g, 2 moles), acetone (240 g, 4.1 moles) and 5% pd on carbon 92.0 g). With reaction conditions of 1500 psi H$_2$ pressure, 80° C. and ca. 6 hours. After filtration, the filtrate was subjected to vacuum to remove light materials. The product was analyzed by amine titration and found to have the content of total amine 7.40 meq/g and secondary amine 7.08 meq/g, which indicated high conversion of EDR-148.

Example 5 (6250-1)—Hydrogenation of bis-Aminoethylether (BAEE) - Acetone Mixture (1:2 Ratio)

To a 1-liter stirred autoclave was charged bisaminoethylether (BAEE) (208 g, 2.0 mole), acetone (232 g, 4.0 moles) and 25 grams of the nickel, copper, chromia catalyst of Example 1. The reactor was flushed twice with hydrogen and pressured to 1500 psi. After heating to 180° C., the hydrogen pressure was raised to 3000 psi and held for 3 hours. The catalyst was recovered by filtration. The filtrate was distilled twice under vacuum to give N-isopropyl bisaminoethylether (58.3 g, bp 91°–94° C./13 mm Hg)$^{(3)}$ and N,N'-diisopropyl bis-aminoethylether (128.2 g, 97°–100° C./10 mm Hg)$^{(4)}$. These compounds were confirmed by H-nmr.

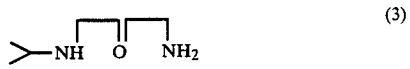

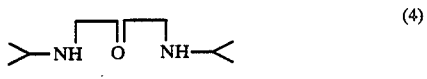

EXAMPLE 6 (6250-40)—Hydrogenation of Tetraethylene Glycol Diamine (Jeffamine EDR-192 Amine) and Acetone (1:2.5 Mole Ratio)

The experimental procedures of Example 1 were repeated, except charging EDR-192 (409 g, 94%, approx. 2 moles), acetone (248 g, 4.9 moles) and 25 grams of the nickel, copper, chromia catalyst of Example 1. The reaction conditions were 3000 psi H$_2$ pressure, 180° C. and 4 hrs. The catalyst was recovered by filtration. The product was distilled to give 312 g of N,N'-diisopropyl triethylene glycol diamine (b.p. 148°–157° C./2.5–3.9 mm Hg). This major product was confirmed by N-nmr to be

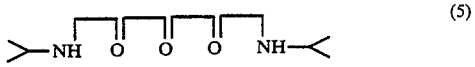

EXAMPLE 7 (6250-33)—Hydrogenation of a Polyoxypropylene Diamine having an Average Molecular Weight of 230 (Jeffamine D-230 Amine) with Acetone (1:4 Mole Ratio)

The experimental procedures were repeated with the mixture of JEFFAMINE ®D-230 (299 g, 1.3 moles), acetone (307 g, 5.2 moles) and 25 grams of the nickel, copper, chromia catalyst of Example 1. The conditions were 3000 psi H$_2$ pressure, 180° C. and ca. 3.5 hours. The catalyst was recovered by filtration. The light materials were removed by cold-trap under vacuum. The crude product was light colored liquid with amine contents of 6.53 meg/g (calc. 6.4 meg/g) for total amine and 4.03 meg/g for secondary amine. (The product was obtained in the amount of 336g).

Example 8 (6250-65)—Hydrogenation of a Polyoxypropylene Diamine having an Average Molecular Weight of 230 (Jeffamine D-230 Amine) and Acetone (1:4 Mole Ratio)

The previous reaction was repeated, except using Pd 5% on c as catalyst. The reaction conditions were 1500 psi $H_2$ pressure, 80° C. and 14 hours. The crude product was filtered and stripped of the light material. The final product was light colored liquid with analyses of 6.16 meg/g total amine (6.37 meg/g calc.) and 6.13 meg/g secondary amine. The high content of secondary amine indicated the high conversion of primary to secondary amine. (The total product recovery was 377 g).

Example 9 (6250-3)—Hydrogenation of a Polyoxypropylene Diamine having an Average Molecular Weight of 2000 (Jeffamine D-2000 Amine) and Acetone (1:6 Mole Ratio)

The reaction procedures of Example 1 were employed, except using JEFFAMINE D-2000 (500 g, 0.25 moles), acetone (87 g, 1.5 moles) and Ni-2715 (25 g). The conditions were 3000 psi $H_2$ pressure, 180° C. and 5 hours. After filtration and vacuum strip-off light material, a liquid material (456 g) was recovered. The analysis indicated the contents of primary amine 0.65 meg/g and secondary amine 0.29 meg/g.

Example 10 (6250-2)—Hydrogenation of Polyoxypropylene Diamine having an Average Molecular Weight of about 400 (Jeffamine D-400 Amine) and Acetone (1:4 Mole Ratio) A similar experimental procedure was used except employing JEFFAMINE D-400 (400 g, 1.0 mole), acetone (232 g, 4.0 meg/g) and 25 grams of the nickel, copper, chromia catalyst of Example 1. The conditions were 3000 psi $H_2$ pressure, 180° C. and approx. 5 hours. After filtration and light material removal, the product had amine content of 1.8 meg/g for primary and 2.1 meg/g for secondary amine.

Example 11 (6250-5)—Hydrogenation of Triethylene Glycol Diamine (Jeffamine EDR-148 Amine) with Methyl Ethyl Ketone (3:1 Mole Ratio)

The experimental procedures were conducted in similar fashion to Example 1. The mixtures of EDR-148 (296 g, 2.0 moles) methyl ethyl ketone (216 g, 3.0 moles) and nickel, copper, chromia catalyst (25 g) were hydrogenated under conditions of 3000 psi $H_2$, 180° C. for ca. 4 hours. After filtration, the product was isolated by vacuum distillation: N-(2-butyl)triethylene glycol diamine (ca. b.p. 136° C./4.6 mm Hg, 228 g)(6), amine content: 9.85 meg/g total and 5.05 meg/g primary.

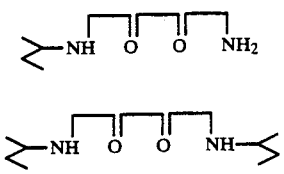

N,N'-di(2-butyl)triethylene glycol diamine (7) (b.p. ca. 142° C./4.0 mm Hg 87 g). Amine content: 7.70 meg/g total and 0.09 meg/g primary. Both compounds (6) and (7) were confirmed by H-nmr.

Example 12 (6285-9)—Hydrogenation of Polyoxypropylene Triamine having an Average Molecular Weight of 400 (Jeffamine T-403 Amine) with Acetone (1:1 Mole Ratio)

To a 1 liter autoclave was charged T-403 (465 g, about 1.0M), acetone (58 g, 1.0M) and Pd/c 1% (2.0 g). The autoclave was sealed and purged with hydrogen. The reaction was then pressured to 1000 psi with hydrogen and heated to 80° C. During the process, the pressure uptake was observed. Additional hydrogen was added to maintain 1500 psi for 7 hours. The reactor was allowed to cool to room temperature. The product mixture was filtered. The filtrate was subjected to vacuum to remove light material, including water, acetone and isopropanol. The product mixture was analyzed: 5.46 meg/g for primary amine and 0.76 meg/g for secondary amine. It is estimated that about 12% of amine is secondary amine in the JEFFAMINE T-403 amine reaction product.

Example 13 (6285-10)—Hydrogenation of Polyoxypropylene Triamine having an Average Molecular Weight of 400 (Jeffamine T-403 Amine) with Acetone (1:2 Mole Ratio)

The same procedures of Example 12 were repeated except using T-403 (465 g, 1M) and acetone (116 g, 2M) and pd/c 1% (2 g). The reaction conditions were 1500 psi $H_2$ and 9 hours at 80° C. The product was filtered and stripped of solvent and by-product. The analyses of final product indicated 5.05 meg/g for primary amine and 1.12 meg/g for 2° -amine. The secondary amine content was estimated to be about 18%.

Example 14 (6285-11)—Hydrogenation of Polyoxypropylene Triamine having an Average Molecular Weight of 400 (Jeffamine T-403 Amine) with Acetone (1:3 Mole Ratio)

Following the same procedures described above. The product contained 4.72 meg/g 1° -amine and 1.37 meg/g 2° -amine. The 2° -amine was about 22%.

Example 15 (6285-83)—Hydrogenation of Polyoxypropylene Triamine having an Average Molecular Weight of 400 (Jeffamine T-403 Amine) with Acetone (1:6 Mole Ratio)

The similar procedures of Example 12 were used except charging T-403 (418 g, 0.9M), acetone (314 g, 5.4M) and pd/c 1% (2 g). The reaction conditions were 2000 psi $H_2$-pressure, 120° C. for ca. 14 hours. After filtration and removal of by-products, the final product contained ca. 84% secondary amine.

Example 20 (6310-100)—Continuous Reaction of Ethylene Diamine and Acetone with Hydrogen Ethylenediamine (120 g, 2 moles), acetone (348 g 6.0 moles) and 25 grams of the nickel, copper chromia catalyst of Example 1 were charged to a 1 liter autoclave. The autoclave was sealed and flushed with hydrogen and then pressured with hydrogen to 1,000 psig. While heating to 130° C., the pressure was increased to 3,000 psig and held at 3,000 psig with incremental supply of hydrogen from a surge tank until no pressure uptake was observed. The pressure uptake ceased after about 8 hours. The reactor was cooled to room temperature and 450 g of liquid product was recovered after filtration. Analysis (G.C.) indicated that there were no major products such as N,N'-diisopropyl ethylenediamine or N-isopropyl ethylenediamine.

Discussion

Note that in Example 1 wherein triethylene glycol diamine was reacted with acetone in the molar ratio of 2 moles of diamine and 3 moles of acetone that both the N,N'-diisopropyl triethylene glycol diamine and the N-isopropyl triethylene glycol diamine were formed whereas in Example 2 wherein the molar ratio of the same reactants was 2:4.1, more than 90% of the reaction product constituted the N,N'-diisopropyl triethylene glycol diamine. In Example 3 wherein the molar ratio for these reactants is 1.0:1.1, note that only about 74% of the diisopropyl amine derivative was obtained.

Good results were obtained in Example 4 at a 2:4.1 molar ratio of triethylene glycol diamine to acetone and this was also the case in Example 5 wherein bisaminoethylether was reacted with acetone in a 1:2 molar ratio. In Example 6, the reaction of tetraethylene glycol diamine with acetone in the molar ratio of 1:2.5 resulted in a substantially quantitative conversion of the feedstock to N,N'-diisopropyl triethylene glycol diamine. However, in Example 7 when a polyoxypropylene diamine was reacted with acetone in the molar ratio of 1:4, only about 62% of the secondary amine was found in the reaction product whereas in Example 8 wherein the molar ratio of the reactants was 1:4, substantially all of the reaction product was the diisopropyl amine derivative. In Example 9 when the polyoxypropylene diamine having a molecular weight of 2000 was used, unsatisfactory results were obtained in that only about 30% of the reaction product was secondary amine. This is also true in Example 10 wherein a polyoxypropylene diamine having a molecular weight of about 400 was reacted with acetone in the ratio 1:4. Unsatisfactory results were also obtained in Example 11 wherein triethylene glycol diamine was reacted with a methyl ethyl ketone.

In Example 12 wherein a polyoxypropylene triamine was reacted with acetone in a 1:1 molar ratio, only about 12% of the secondary amine was formed. This is also true for Example 13 wherein the reactants were reacted in the molar ratio of 1:2 and Example 14 wherein a molar ratio of 1:3 was employed. However, in Example 15 when the polyoxypropylene triamine was reacted with acetone in a 1:6 ratio, the final product contained 84% secondary amine.

In contrast to the foregoing results, when an attempt was made to react hydrogen with ethylenediamine and acetone in the presence of a hydrogenation catalyst in a 3:1 mole ratio under the reaction conditions of the present invention, negative results were obtained in that there was no detectable formation of either N,N'-diisopropyl ethylenediamine or N'-isopropyl ethylenediamine.

Use of N-(2-Butyl)Polyoxyethylene and/or Polyoxypropylene Diamines and Triamines as Epoxy Curing Agents Example 17 (6250-73-2)—Usage of 1° and 2° Amine Mixtures from EDR-148/Acetone/H₂ Reactions The mixture of N-isopropyl triethylene glycol diamine (ca. 75%) and N,N'-diisopropyl triethylene glycol diamine (ca. 25%), 15 g (6250-73-2) and EPON ®828 (37 g) was mixed well and poured into a mold. After curing at ca. 70° C. for 2 hours, a flexible, transparent and tough material was made. The reaction was repeated except using N,N'-diisopropyl triethylene glycol diamine (11.7 g, 95% pure) and EPON 828 (18.7 g). After heating at 70° C. for a few hours, it was observed that the mixture failed to cure at this temperature. After overnight curing, a soft material was obtained (transparent, plastic-like).

Example 18 (6285-11-1)—Usage of Product

The sample of 6285-11-1 containing 22% secondary amine (10 g) was mixed thoroughly with EPON ®828 (Shell product, 20 g). The fluid mixture was poured into a mold and cured at approx. 80° C. overnight. The material was hard, transparent polymer product.

Example 19 (6285-83-1)

The sample of 6285-83-1 containing 84% secondary amine (10 g) and EPON 828 (13 g) was mixed and poured into a mold and cured at approx. 80° C. for overnight. The material was very soft, flexible at 80° C. and hard at room temperature. A thermoplastic-like unique material was obtained.

Comments

Note from Example 17 that use of the N,N'-diisopropyl triethylene glycol diamine product of the present invention to cure a 1,2-epoxy resin resulted in the formation of a cured product which was soft and transparent. In Example 18 wherein the product was a triamine, a hard transparent material was obtained when the product contained only 22% of the secondary amine. However, in Example 19 wherein the curing agent contained 84% secondary amine, a unique thermoplastic flexible epoxide product was formed.

It is seen from this that the secondary diamine and triamine reaction products of the present invention are excellent flexible curing agents for epoxy resins.

WORKING EXAMPLES—CONTINUOUS RUNS

There is a significant improvement in reaction selectivity with an improved production of the desired di- and tri-secondary isopropyl amine reaction products when the polyoxyalkylene primary diamine and triamine starting materials of the present invention and acetone are reacted with hydrogen in the presence of a fixed bed of a pelleted hydrogenation catalyst (preferably a nickel-containing hydrogenation catalyst, such as one containing about 60 to about 85 mole percent of nickel, about 14 to about 37 mole percent of copper and about 1 to about 5 mole percent of chromium, as chromia) in a continuous reactor under reaction conditions including a temperature of about 100° C. to about 200° C. and a total pressure of about 1,000 to about 4,000 psig, including a hydrogen partial pressure of about 1,000 to about 4,000 psig, at a liquid hourly space velocity for the combined acetone and diamine or triamine feed components of about 0.5 to about 3 w/hr/w. This is illustrated by the following examples.

Example 20 (6310-88)—Continuous Reaction of Triethylene Glycol Diamine (Jeffamine EDR-148 Amine) and Acetone with Hydrogen The experiment was performed in a 1,250 ml. tubular reactor having an inner diameter of 1.337 inches and a catalyst bed depth of 56 inches. A thermowell fabricated from ¼ inch o.d. tubing extended upward into the catalyst bed a distance of about 46 inches to allow temperature measurements at four different points. The reactor was jacketed to allow circulation of liquid Dowtherm for temperature control.

Jeffamine EDR-148 amine and acetone were pumped separately at rates of about 0.63 #/hr and 0.74 #/hr, respectively, and were combined into a single liquid feed before entering the bottom of the reactor. Also, about 26 liters/hr of hydrogen gas (expressed at 0° C. and 1 atmosphere) were charged to the bottom of the reactor. These feed rates represent a feed mole ratio of 3.00 moles of acetone/mole of EDR-148, a space velocity of 0.5 g of liquid feed per hour per pound of catalyst and a 100% excess of hydrogen feed, basis the acetone charge. Liquid and gas feeds were passed upward through the catalyst bed and maintained at a temperature in the range of 133° to 150° C. Reactor effluent was cooled and passed through a back-pressure regulator set to maintain 2,500 psig pressure in the reactor. Product from the regulator was discharged into a receiver in which the liquid product was collected at atmospheric pressure and from which gases were vented. Analysis of the liquid product indicated that a 100% conversion of the EDR-148 starting material was obtained, giving 93% of di-secondary isopropylamine product and 4% of mono-secondary isopropyl amine product on a mole basis.

Example 20 was essentially repeated, except for changes in space velocity and feedstock, as noted in Table 1 with the results that are there set forth.

TABLE 1

Continuous Phase Production of N,N'-Diisopropyl Polyoxyethylene and Polyoxypropylene Diamines

| Notebook Number | Starting Amine | Amine/Acetone Molar Ratio | LSHV | Conversion Based on Amine | Selectivity Percent di-Sec. | mono Sec. |
|---|---|---|---|---|---|---|
| 6310-88 | EDR-148 | 1:3 | 0.5 | 100 | 93 | 4 |
| 6340-1 | EDR-148 | 1:3 | 1.0 | 100 | 88 | 8 |
| 6340-2 | EDR-148 | 1:2.4 | 0.5 | 100 | 75 | 20 |
| 6340-3 | EDR-148 | 1:2.4 | 1.0 | 100 | 79 | 18 |
| 6340-4 | EDR-148 | 1:4 | 0.5 | 100 | 95 | 3 |
| 6340-7 | EDR-192 | 1:3 | 1.0 | 100 | 90 | 6 |
| 6340-8 | EDR-192 | 1:3 | 2.0 | 100 | 87 | 13 |
| 6340-13 | D-230 | 1:3 | 1.0 | — | 64(2°) | |
| 6340-18 | EDA | 1:3 | 1.0 | 100 | 70 | 20 |
| 6340-19 | EDA | 1:4 | 1.0 | 100 | 92 | |

The foregoing examples are given by way of illustration only and are not intended as limitations on the scope of this invention as defined by the appended claims.

What is claimed is:

1. A curable epoxy resin composition comprising:
   (a) a vicinal epoxy resin having an epoxide equivalency of about 0.8 to about 1.2, and
   (b) a curing amount of an epoxy resin curing agent represented by the formula:

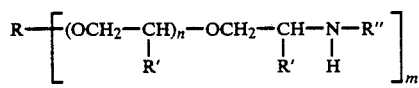

wherein R is the nucleus of an oxyalkylation susceptible polyhydric alcohol containing 2 to 12 carbon atoms and 2 or 3 hydroxy groups,
R' is hydrogen or methyl,
at least one of R" is isopropyl and the remainder of R" is hydrogen or isopropyl,
n is a number sufficient to impart a molecular weight of about 200 to 400 to the molecule, and
m is a positive integer having a value of 2 or 3.

2. A curable epoxy resin composition as in claim 1 wherein the curing agent has the formula:

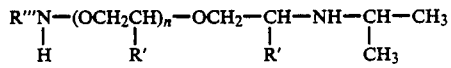

wherein n is a number sufficient to impart a molecular weight of about 200 to 400 to the molecule,
R' represents hydrogen or methyl, and
R'" represents hydrogen or an isopropyl group.

3. A curable epoxy resin composition as in claim 1 wherein the curing agent comprises N,N'-diisopropyl triethylene glycol diamine.

4. A curable epoxy resin composition as in claim 1 wherein the curing agent has the formula:

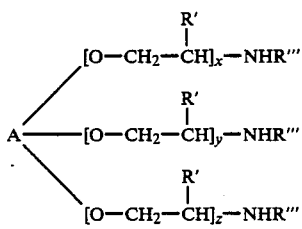

wherein
R' represents hydrogen or methyl,
R'" represents 1 to 3 isopropyl groups and the remainder of R'" is H,
A represents the nucleus of an oxyalkylation-susceptible trihydric alcohol containing 3 to 12 carbon atoms,
x, y and z represent numbers, and the sum of x+y+z represents a number sufficient to impart a molecular weight of about 220 to about 400 to the molecule.

5. A curable epoxy resin composition as in claim 4 wherein R' is methyl, A represents the nucleus of trimethylol propane and the sum of x+y+z represents a number sufficient to impart a molecular weight of about 400 to the molecule.

6. A cured epoxy resin product comprising the product obtained on curing a curable epoxy resin composition comprising:
   (a) a vicinal epoxy resin having an epoxide equivalency of about 0.8 to about 1.2, and (b) a curing amount of an epoxy resin curing agent represented by the formula:

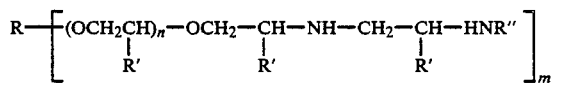

wherein at least one of R" is isopropyl and the remainder of R" is hydrogen or isopropyl,
wherein R is the nucleus of an oxyalkylation susceptible polyhydric alcohol containing 2 to 12 carbon atoms and 2 or 3 hydroxy groups,
R' is hydrogen or methyl,
n is a number sufficient to impart a molecular weight of about 200 to 400 to the molecule, and
m is a positive integer having a value of 2 or 3.

7. A cured epoxy resin composition as in claim 6 wherein the curing agent has the formula:

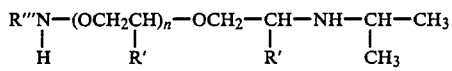

wherein n is a number sufficient to impart a molecular weight of about 200 to 400 to the molecule,
R' represents hydrogen or methyl, and
R''' represents hydrogen or an isopropyl group.

8. A cured epoxy resin composition as in claim 7 wherein the curing agent comprises N,N'-diisopropyl triethylene glycol diamine.

9. A cured epoxy resin composition as in claim 6 wherein the curing agent has the formula:

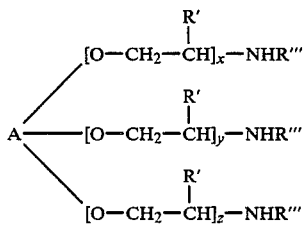

wherein:
R' represents hydrogen or methyl,
R''' represents 1 to 3 isopropyl groups and the remainder of R''' is H,
A represents the nucleus of an oxyalkylation-susceptible trihydric alcohol containing 3 to 12 carbon atoms,
x, y and z represent numbers, and
the sum of x+y+z represents a number sufficient to impart a molecular weight of about 220 to about 400 to the molecule.

10. A cured epoxy resin composition as in claim 9 wherein R' is methyl, A represents the nucleus of trimethylol propane and the sum of x+y+z represents a number sufficient to impart a molecular weight of about 400 to the molecule.

11. In a method of curing a vicinal epoxy resin having an epoxy equivalence of about 0.8 to 1.2 wherein a curing agent is incorporated into said vicinal epoxy resin and the resultant composition is heated for a period of time sufficient to react the curing agent with the vicinal epoxy resin and cure said resultant composition, the improvement which comprises using as the curing agent a compound having the formula:

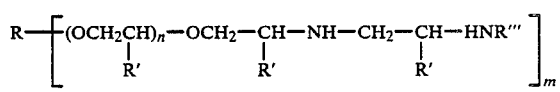

wherein at least one of R''' is isopropyl and the remainder of R''' is hydrogen or isopropyl,
wherein R is the nucleus of an oxyalkylation susceptible polyhydric alcohol containing 2 to 12 carbon atoms and 2 or 3 hydroxy groups,
R' is hydrogen or methyl,
n is a number sufficient to impart a molecular weight of about 200 to 400 to the molecule, and
m is a positive integer having a value of 2 or 3.

12. In a method as in claim 11, the improvement wherein the curing agent has the formula:

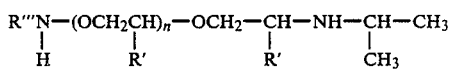

wherein n is a number sufficient to impart a molecular weight of about 200 to 400 to the molecule,
R' represents hydrogen or methyl, and
R''' represents hydrogen or an isopropyl group.

13. In a method as in claim 12, the improvement wherein the curing agent is N,N'-diisopropyltriethylene glycol diamine.

14. In a method as in claim 11, the improvement wherein the curing agent has the formula:

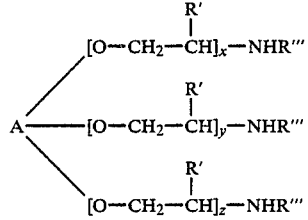

wherein:
R' represents hydrogen or methyl,
R''' represents 1 to 3 isopropyl groups and the remainder of R''' is H,
A represents the nucleus of an oxyalkylation-susceptible trihydric alcohol containing 3 to 12 carbon atoms,
x, y and z represent numbers, and
the sum of x+y+z represents a number sufficient to impart a molecular weight of about 220 to about 400 to the molecule.

15. In a method as in claim 12, the improvement wherein the curing agent is a curing agent of the formula of claim 13 wherein R' is methyl, A represents the nucleus of trimethylol propane and the sum of x+y+z represents a number sufficient to impart a molecular weight of about 400 to the molecule.

* * * * *